Nov. 8, 1932.    A. T. POTTER    1,886,583
WINDSHIELD OPERATOR
Filed Oct. 6, 1928    2 Sheets-Sheet 1

INVENTOR.
Albert T. Potter
BY Francis D Hardesty
ATTORNEY.

Nov. 8, 1932.  A. T. POTTER  1,886,583
WINDSHIELD OPERATOR
Filed Oct. 6, 1928  2 Sheets-Sheet 2

INVENTOR.
Albert T. Potter
BY
Francis O. Hardesty
ATTORNEY.

Patented Nov. 8, 1932

1,886,583

UNITED STATES PATENT OFFICE

ALBERT T. POTTER, OF DETROIT, MICHIGAN, ASSIGNOR, BY MESNE ASSIGNMENTS, TO AINSWORTH MANUFACTURING CORPORATION, OF DETROIT, MICHIGAN, A CORPORATION OF MICHIGAN

WINDSHIELD OPERATOR

Application filed October 6, 1928. Serial No. 310,712.

The present invention relates to windshield operators for vehicles and particularly to the type wherein means is provided for moving the windshield angularly and for maintaining it in its adjusted angular position.

Heretofore devices of this character have been provided with means for attachment to the windshield section, comprising a member which embraces the frame member holding the windshield glass. Such device offers difficulty in effectively sealing the opening between the windshield frame and the adjacent sill or body member.

Among the objects of the present invention is, therefore, to provide a device for operating the windshield with means for attaching same in such fashion as to offer no obstruction to the sealing of the said opening.

Another object is a device of the type indicated which because of its lack of protruding parts shall be of much neater appearance than those heretofore used.

Still other objects will occur to those skilled in the art upon reference to the following description and the accompanying drawings in which Fig. 1 is a vertical section through the operating device and windshield section with the operating crank removed.

Figure 1:
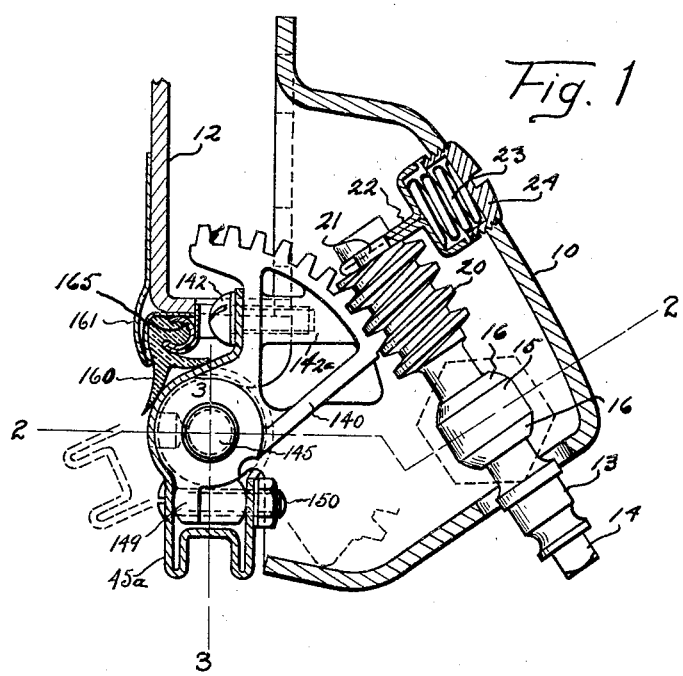

As indicated in the drawings the device comprises a housing 10 provided with flanges 11 for attachment to a body member 12. This housing is roughly triangular in section with one side extending vertically and has mounted within it a shaft 13 extending from the housing and provided with a squared end 14 for the reception of a crank (not shown).

The shaft 13 intermediate its ends is provided with an enlargement 15 having spherical bearing surfaces 16 cooperating with bearing members 17 carried in the sides of the housing. One of the bearing members 17 is preferably mounted directly in the housing wall while the other is held in place by a suitable screw plug 18 and lock nut 19.

The inner end of the shaft 13 is provided with a threaded portion 20 and a reduced portion 21 which latter cooperates with a fork 22 pressed inwardly by a spring 23 which latter abuts against a screw plug 24 serving to adjust the pressure as well as hold the spring in place.

The shaft 13 at its threaded part 20 coacts with a gear segment 140 which in turn is fixed to the movable windshield member so that when the shaft is rotated the windshield member will be moved angularly about the center of the gear segment.

Figure 2:
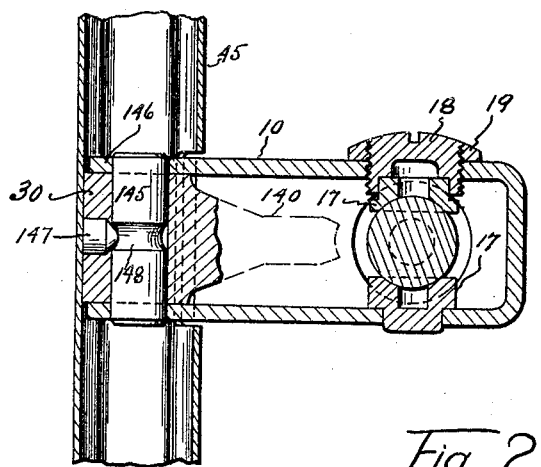
Fig. 2 is a section on line 2—2 of Fig. 1.
Figure 3:
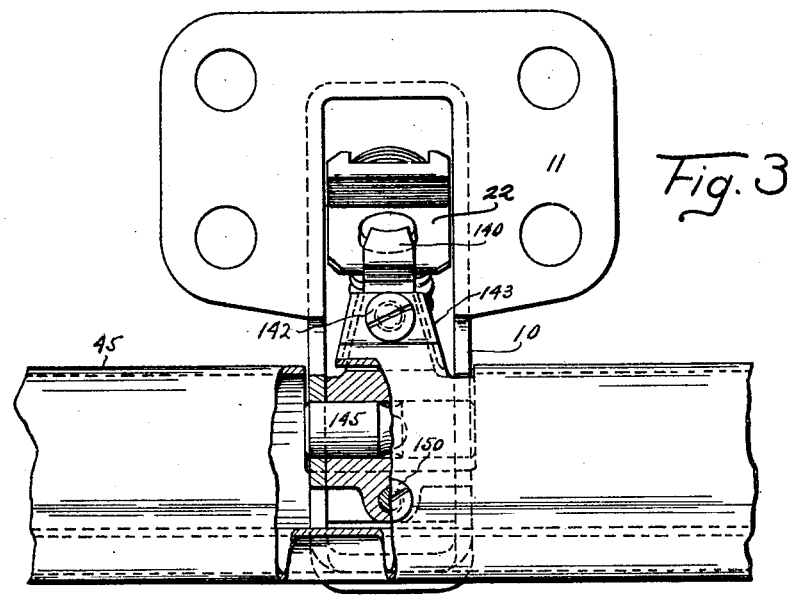
Fig. 3 is a front view with parts in vertical section on line 3—3 of Fig. 1 showing the mechanism as attached to the movable windshield member but unmounted on the vehicle body.
Figure 4:
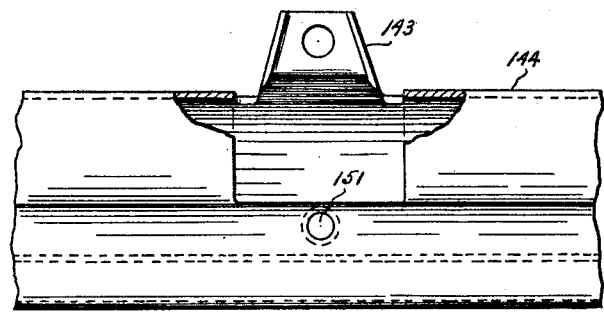
Fig. 4 is a rear elevation of a part of the windshield frame with portions broken away to show the construction.

As shown best in Figs. 1 to 3 the gear segment 140 is provided with a hub portion 30 of such size as to fit within the frame member 45 which is preferably substantially circular with a depending extension 45a within which the glass is secured. The hub portion is further provided with a depending portion or lug 149 which extends into the part 45a of the frame 45 in which this depending lug is secured as by a bolt 150.

As indicated best in Fig. 2 the housing 10 is provided with ears 146 of circular contour which also extend into the windshield frame member 45 and serve to prevent motion of the hub member 30 lengthwise of the frame 45. These ears 146 also furnish bearing for an axially located pin 145 extending through the hub 38 and the ears 146 and held in position therein by means of a plug 147 extending radially through the hub into a groove 148 formed in the pin 145.

The windshield frame member 145 is also provided with an upwardly extending ear or lug 143 which may be secured to the gear segment 140 as by a screw 142 passing through the lug into a suitable boss 142a provided in the segment.

By providing the segment 140 with the attaching means just described it is unnecessary to have any protruding parts on the front or exposed side of the windshield frame 45 and it becomes a comparatively simple matter to seal the opening between the windshield frame member and sill or body member 12.

In the form of device shown in Fig. 1 the sealing of this opening is accomplished by means of a strip of rubber or other suitable flexible material 160 which is shown as having its lower edge bifurcated and as having its upper part provided with a bead adapted to be embraced by a metallic member 165, which latter is secured to the under side of body member 12 in any suitable manner and the strip 160 may be further secured in place by means of the overhanging metallic member 161 secured in any suitable fashion also to the body member 12.

Now having described the invention and the preferred form of embodiment thereof it is to be understood that the said invention is to be limited not to the specific details herein set forth and illustrated but only by the scope of the claims which follow:

1. In a windshield operating device, a gear segment adapted to be secured to the movable windshield member and adapted to be rotated, a hub on said segment having a depending lug, said hub adapted to enter the windshield frame through a suitable opening and said frame adapted to be fixed thereto to prevent relative rotation of the hub and frame, and a vertically extending ear on said frame extending above the opening through which said hub is inserted and means for fixing said ear to the said segment.

2. In combination, an elongated tubular frame, and an operating member comprising a hub disposed within and secured to said frame, and an arm on said hub projecting therefrom thru an opening in the frame in the back thereof, and a housing rearwardly projecting from the back of the frame and having portions disposed within the latter and secured within the latter to the hub portion, the latter being rotatable in the housing portions.

3. In combination, an elongated tubular frame, and an operating member comprising a hub disposed within and secured to said frame, and an arm on said hub projecting therefrom thru an opening in the frame in the back thereof, and a housing rearwardly projecting from the back of the frame and having portions disposed therewithin and secured within the frame to the hub portion, the latter being rotatable in the housing members, and an operating member in said housing adapted to cooperate with said arm.

4. In combination, an operating unit comprising a tubular elongated frame, an arm secured to said frame so as to be non-rotatable with respect thereto, a housing secured to said arm and to said frame and with respect to which said arm and said frame rotate and a member in said housing adapted to cooperate with the arm to rotate the latter and the frame, the means for securing the arm to the housing being inside the frame, whereby the front of the frame is free from any securing projections.

5. In combination, an elongated tubular frame, an operating member secured to said frame by means on the back thereof which leaves the front thereof free of projections, and a relatively short housing for said operating member, also disposed on the back of said frame, and secured thereto by portions operatively integral with said housing and disposed within said frame and entering the latter from the back thereof and presenting no portions surrounding the frame or projecting thru the latter to the front thereof.

6. In combination, a windshield having a tubular hollow frame fixed on the top edge thereof, the latter having an aperture in the rear wall thereof, a gear sector for operating said windshield disposed outside of and at a distance from said windshield and having a hub portion disposed within said frame and adjacent said aperture, the latter affording an entrance into the frame for the hub portion, means in said frame fixing the hub against movement with respect to the windshield, a toothed element cooperating with said sector for rotating the latter and the windshield, a housing for said toothed element supported adjacent the rear side of said windshield frame and presenting portions disposed within the latter, the front and top walls of said frame presenting a surface which is substantialy smooth and free from projections, the windshield frame being secured to said housing by means passing thru the portions thereof disposed within the frame.

7. In combination, a windshield having a tubular hollow frame fixed on the top edge thereof, the latter having an aperture in the rear wall thereof, a gear sector for operating said windshield and having a hub portion disposed within said frame and adjacent said aperture, the latter affording an entrance into the frame for the hub portion, and means in said frame fixing the hub against movement with respect to the windshield, the front and top walls of said frame presenting a surface which is substantially smooth and free from projections, a housing supported adjacent the rear side of said frame and having ears projecting into the rear wall aperture of said frame and providing means by which the housing and frame can be secured to each other and a worm in said housing cooperating with said gear sector to cause rotation of the latter and the windshield fixed thereto.

8. In combination, a windshield having a tubular hollow frame fixed on the top edge thereof, the latter having an aperture in the rear wall thereof, a gear sector for operating said windshield and having a hub portion disposed within said frame and adjacent said aperture, the latter affording an entrance into the frame for the hub portion, and means in said frame fixing the hub against movement with respect to the windshield, the front and top walls of said frame presenting a surface which is substantially smooth and free from projections, a housing supported adjacent the rear side of said frame and having ears projecting into the rear wall aperture of said frame and providing means by which the housing and frame can be secured to each other, and a worm in said housing cooperating with said gear sector to cause rotation of the latter and the windshield fixed thereto, said housing ears and said hub being insertable into the frame as a unit without disassembling.

9. In combination, a windshield having a tubular hollow frame fixed on the top horizontal edge thereof, the latter having an aperture in the rear wall thereof, a gear sector for operating said windshield and having a horizontal hub portion disposed within said frame and adjacent said aperture, the latter affording an entrance into the frame for the hub portion, and means in said frame fixing the hub against movement with respect to the windshield, the front and top walls of said frame presenting a surface which is substantially smooth and free from projections, a housing supported near the rear wall aperture of said frame and having ears projecting into the rear wall aperture of said frame and providing means by which the housing and frame can be secured to each other, and a worm in said housing cooperating with said gear sector to cause rotation of the latter and the windshield fixed thereto, and a vertically projecting extension on said hub member fixed to a wall of the frame.

10. In combination, a windshield having a tubular hollow frame fixed on the top edge thereof, the latter having an aperture in the rear wall thereof, a gear sector for operating said windshield and having a hub portion disposed within said frame and adjacent said aperture, the latter affording an entrance into the frame for the hub portion, and means in said frame fixing the hub against movement with respect to the windshield, the front and top walls of said frame presenting a surface which is substantially smooth and free from projections, a housing supported adjacent the rear side of said frame and having ears projecting into the rear wall aperture of said frame and providing means by which said housing and frame can be secured to each other, and a worm in said housing cooperating with said gear sector to cause rotation of the latter and the windshield fixed thereto, and an extension on said hub member fixed to a wall of the frame.

11. In combination, a windshield having a tubular hollow frame fixed on the horizontal top edge thereof, the latter having an aperture in the rear wall thereof, a gear sector for operating said windshield and having a horizontal hub portion disposed within said frame and adjacent said aperture, the latter affording an entrance into the frame for the hub portion, and means in said frame fixing the hub against movement with respect to the windshield, the front and top walls of said frame presenting a surface which is substantially smooth and free from projections, a housing supported adjacent the rear side of said frame and having ears projecting into the rear wall aperture of said frame and providing means by which said housing and frame can be secured to each other, and a worm in said housing cooperating with said gear sector to cause rotation of the latter and the windshield fixed thereto, said housing ears and said hub being insertable into the frame as a unit, without disassembling and a vertically projecting extension on said hub member fixed to a wall of the frame.

12. In a windshield and operating mechanism assembly, the combination with an apertured windshield frame of a preassembled operating unit including an operator housing attachable to said frame, said housing having a portion entered into said frame thru said aperture and secured therein.

13. In a windshield and operating mechanism assembly, the combination with an apertured windshield frame of a preassembled operating unit, including an operator housing, attachable to said frame, said housing having a portion entered into said frame thru said aperture, and a gear member in said housing and having a portion entered into said frame thru said aperture.

14. In a windshield and operating mechanism assembly, the combination with an apertured windshield frame of a preassembled operating unit including an operator housing, attachable to said frame, said housing having a portion entered into said frame thru said aperture, and a gear member in said housing and having a portion entered into said frame thru said aperture, said gear member portion being journalled, within said frame, to said housing portion.

15. In combination with an elongated tubular windshield frame having an aperture therein, a preassembled unit including a housing containing windshield operator parts, the housing having portions insertable in said windshield frame thru said aperture, and adapted to close said aperture, when so inserted, the insertion being accomplished without disassembling the unit, the unit being secured to said frame by means within the latter.

16. In combination with an elongated tubular windshield frame having an aperture therein, a preassembled unit including a housing containing windshield operator parts, the housing having portions insertable in said windshield frame thru said aperture, and adapted to close said aperture, when so inserted, the insertion being accomplished without disassembling the unit, the unit being secured to said frame by means within the latter, and a gear member in said housing and having a portion entered into said frame thru said aperture.

17. In combination with an elongated tubular windshield frame having an aperture therein, a preassembled unit including a housing containing windshield operator parts, the housing having portions insertable in said windshield frame thru said aperture, and adapted to close said aperture, when so inserted, the insertion being accomplished without disassembling the unit, the unit being secured to said frame by means carried by the latter, and a gear member in said housing and having a portion entered into said frame thru said aperture, said gear member portion being journalled, within said frame, to said housing portions.

18. In combination an elongated tubular frame, an operating member comprising a hub disposed within and secured to said frame, an arm on said hub projecting therefrom thru an opening in the frame in the back thereof, a housing rearwardly projecting from the back of the frame and having spaced portions disposed within the latter and secured within the latter to the hub portion by means including an axle pin in said hub and projecting into the spaced housing portions, the pin being shorter than the length of the frame opening, and means passing thru the frame from the exterior into engagement with said pin to hold the latter in the hub, the latter being rotatable on the pin and in the housing portions.

ALBERT T. POTTER.